United States Patent
Yamazumi et al.

(10) Patent No.: US 9,638,262 B2
(45) Date of Patent: May 2, 2017

(54) DAMPER APPARATUS

(71) Applicant: AISIN SEIKI KABUSHIKI KAISHA, Kariya-shi (JP)

(72) Inventors: Atsushi Yamazumi, Kariya (JP); Yasuyuki Imai, Anjo (JP); Tsuneo Ukei, Toyoake (JP); Masakazu Kamiya, Toyoake (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/658,340

(22) Filed: Mar. 16, 2015

(65) Prior Publication Data
US 2015/0267756 A1 Sep. 24, 2015

(30) Foreign Application Priority Data

Mar. 19, 2014 (JP) ................................. 2014-056039

(51) Int. Cl.
| | |
|---|---|
| *F16D 3/12* | (2006.01) |
| *F16D 3/66* | (2006.01) |
| *F16D 13/40* | (2006.01) |
| *F16F 15/129* | (2006.01) |
| *F16F 15/139* | (2006.01) |
| *F16D 13/70* | (2006.01) |

(52) U.S. Cl.
CPC .................. *F16D 3/12* (2013.01); *F16D 3/66* (2013.01); *F16D 13/40* (2013.01); *F16F 15/1297* (2013.01); *F16F 15/1395* (2013.01); *F16F 15/1397* (2013.01); *F16D 2013/703* (2013.01); *F16D 2300/22* (2013.01)

(58) Field of Classification Search
CPC ... F16D 3/12; F16D 3/66; F16D 13/40; F16D 2013/703; F16D 2300/22; Y10T 10/6204
USPC .......... 464/45, 46, 66.1, 68.1; 192/55.1, 212
See application file for complete search history.

(56) References Cited

U.S. PATENT DOCUMENTS

| | | | |
|---|---|---|---|
| 6,923,725 B2* | 8/2005 | Takeuchi | F16F 15/129 |
| 8,282,494 B2* | 10/2012 | Saeki | F16F 15/12366 464/46 |
| 2011/0177906 A1 | 7/2011 | Misu et al. | |
| 2012/0242017 A1* | 9/2012 | Saeki | F16D 3/66 |

FOREIGN PATENT DOCUMENTS

JP 2010-216523 A 9/2010

* cited by examiner

*Primary Examiner* — Gregory Binda
(74) *Attorney, Agent, or Firm* — Buchanan Ingersoll & Rooney PC

(57) ABSTRACT

A damper apparatus includes a damper portion including an elastic member to absorb a torque fluctuation by expansion and contraction of the elastic member in a circumferential direction of the damper portion, and a limiter portion connected to the damper portion to restrict a transmission of a torque which exceeds a predetermined value, the limiter portion including a first member and a second member being rotatable at a rotation center, a friction member sandwiched between the first member and the second member, and a third member connected to the first member, the third member including a spindle portion and a plate spring portion integrally formed with the spindle portion to press the first member and the second member in a state where the friction member is sandwiched between the first member and the second member.

8 Claims, 3 Drawing Sheets

DAMPER APPARATUS

CROSS REFERENCE TO RELATED APPLICATIONS

This application is based on and claims priority under 35 U.S.C. §119 to Japanese Patent Application 2014-056039, filed on Mar. 19, 2014, the entire content of which is incorporated herein by reference.

TECHNICAL FIELD

This disclosure generally relates to a damper apparatus.

BACKGROUND DISCUSSION

A known damper apparatus disclosed, for example, in JP2010-216523A includes a damper portion including an elastic member which is provided between an input portion for inputting a power from a power unit and an output portion for outputting the power to absorb torque fluctuation by expansion and contraction of the elastic member in a circumferential direction of the damper portion, and a limiter portion causing the input portion and the output portion to slip and rotate relative to each other in a case where excessive torque is input to one of the input portion and the output portion to thereby restrict the excessive torque from being transmitted to the other of the input portion and the output portion.

According to the damper apparatus including the damper portion and the limiter portion, it is not desirable to increase the number of components or the size of the apparatus, for example. That is, the damper apparatus including a more simplified configuration than the known damper apparatus that includes the damper portion and the limiter portion is desirable. For example, the damper apparatus disclosed in JP2010-216523A includes a lining plate in addition to a center plate serving as a center of the damper portion. The lining plate is configured not to interfere with the damper portion so that the limiter portion is provided at a radially outer side of the damper portion.

A need thus exists for a damper apparatus which is not susceptible to the drawback mentioned above.

SUMMARY

According to an aspect of this disclosure, a damper apparatus includes a damper portion including an elastic member which is provided between an input portion for inputting a power from a power unit and an output portion for outputting the power to absorb a torque fluctuation by expansion and contraction of the elastic member in a circumferential direction of the damper portion, and a limiter portion connected to the damper portion and causing the input portion and the output portion to slip and rotate relative to each other in a case where a torque which exceeds a predetermined value is input from one of the input portion and the output portion to restrict a transmission of the torque which exceeds the predetermined value to the other of the input portion and the output portion, the limiter portion including a first member and a second member being rotatable at a rotation center, a friction member sandwiched between the first member and the second member, and a third member connected to the first member, the third member including a spindle portion and a plate spring portion integrally formed with the spindle portion to press the first member and the second member in a state where the friction member is sandwiched between the first member and the second member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment will be explained with reference to the attached drawings. Configurations (technical features) of the embodiment explained below and effects resulting from such configurations are examples. The embodiment may be achieved by other configurations than the following disclosure and may obtain various effects (including consequential effects) from basic configurations (technical features).

A damper apparatus 100 in the embodiment is positioned, for example, between an engine (i.e., a power unit) and a transmission. The damper apparatus 100 may absorb (i.e., temporarily store) fluctuation of driving force (torque, rotation or power). The damper apparatus 100 is not necessarily provided between the engine and the transmission and may be provided between two rotational elements, for example, between the engine and a rotary machine (motor generator). Further, the damper apparatus 100 may be provided at various vehicles (for example, a hybrid vehicle) or at a machinery including a rotation element, for example. In the following, unless otherwise specified, an axial direction, a radial direction and a circumferential direction are defined on the basis of the rotation axis Ax. In the embodiment, for convenience, a view from a left side in FIG. 2 is referred to as a front side view while a view from a right side in FIG. 2 is referred to as a rear side view.

Figure 1:
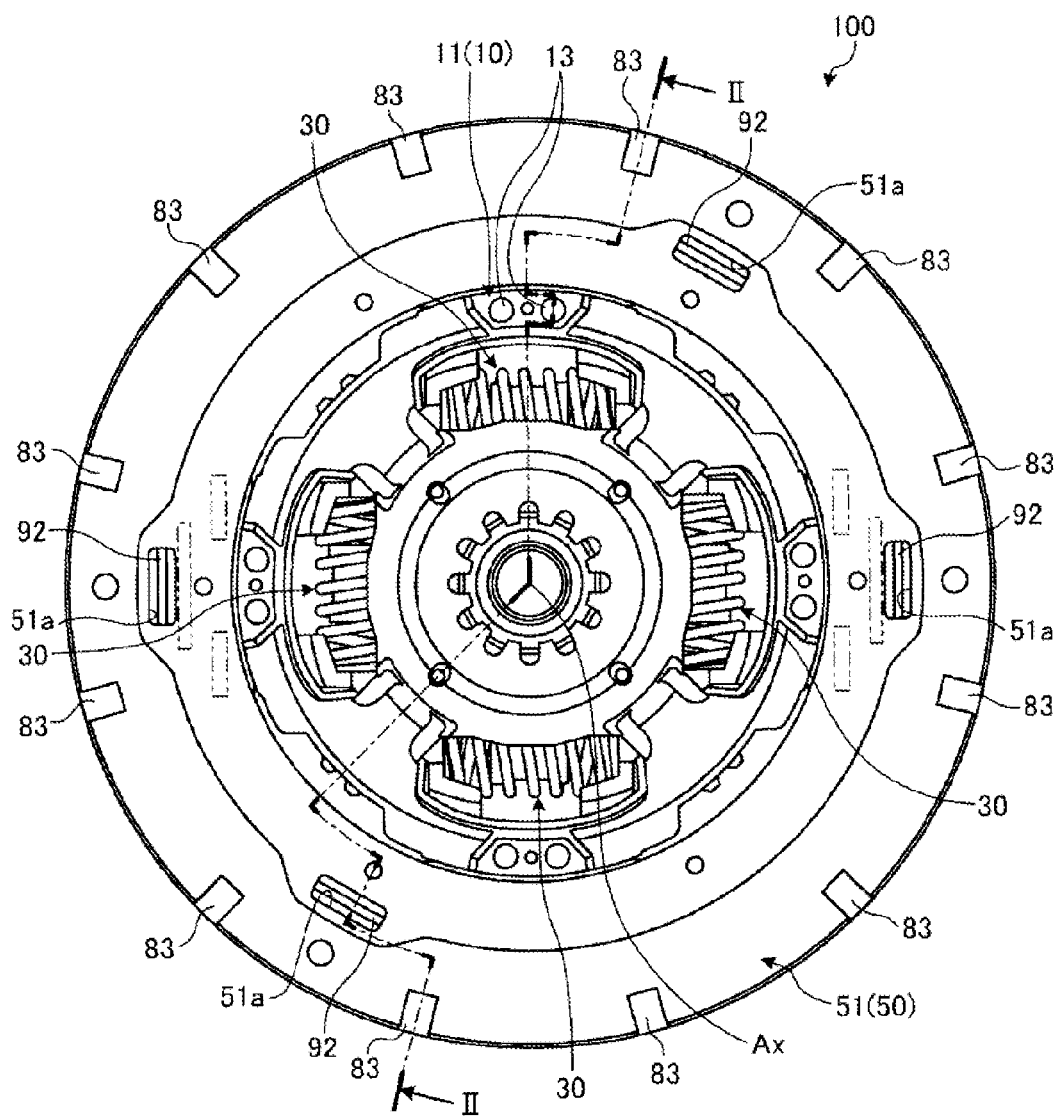
FIG. 1 is a front view of a damper apparatus according to an embodiment disclosed here.

The damper apparatus 100 rotates about the rotation axis Ax. As illustrated in FIGS. 1 and 2, the damper apparatus 100 as a whole is formed in an axially thin and flat disc form.

Figure 2:
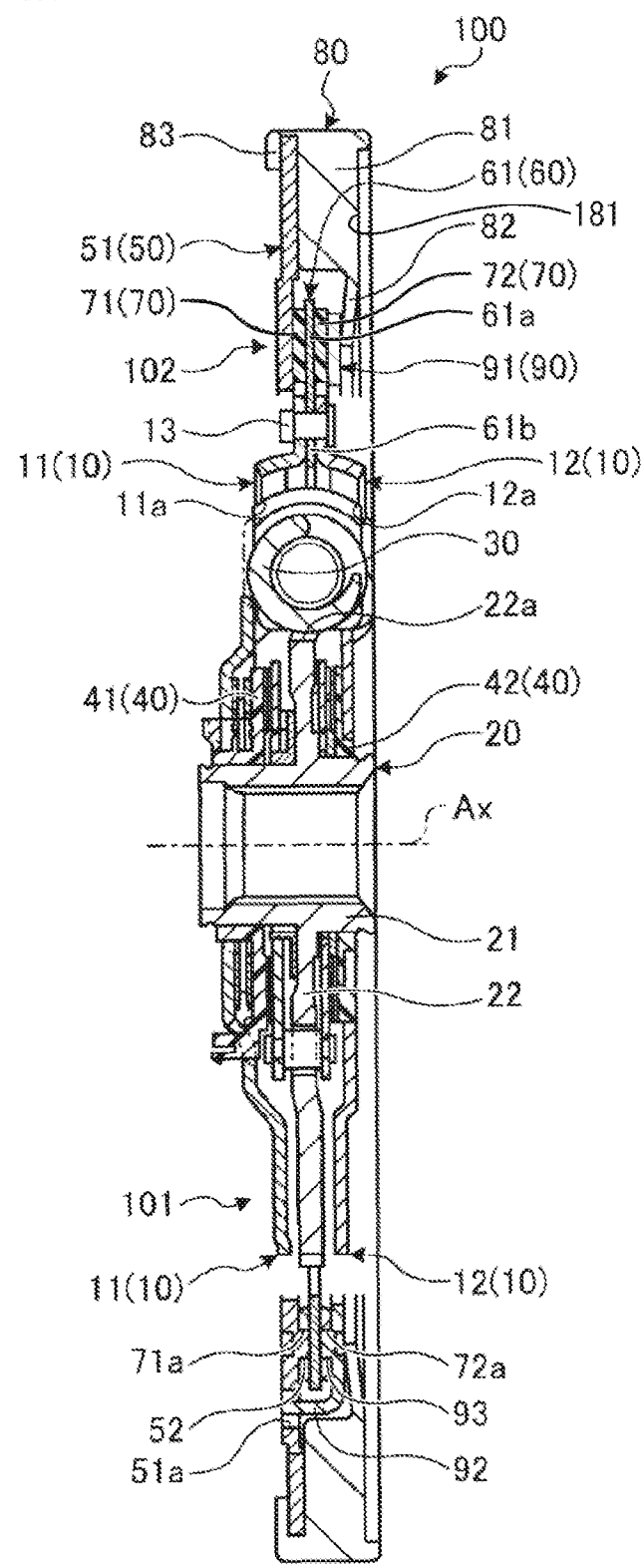
FIG. 2 is a cross-sectional view taken along line II-II in FIG. 1.

The damper apparatus 100 includes a damper portion 101 and a limiter portion 102 as illustrated in FIG. 2. The damper portion 101 is positioned at a radially inner side of the limiter portion 102 while the limiter portion 102 is positioned at a radially outer side of the damper portion 101. The damper portion 101 is formed in an axially thin and flat disc form. The limiter portion 102 is formed in an axially thin and flat annular disc form. The damper portion 101 absorbs fluctuation of torque output from the engine by elastic expansion and contraction of elastic members 30. The limiter portion 102 interrupts and blocks excessive torque transmission by slippage generated between members in a laminated state which are pressed against each other.

The damper portion 101 includes a side plate 10, an inner plate 20 (hub), the elastic members 30, and a slide member 40. One of the side plate 10 and the inner plate 20 (for example, the side plate 10 serving as an input portion for inputting a power from a power unit) is connected to an input side (i.e., an engine side) while the other of the side plate 10 and the inner plate 20 (for example, the inner plate 20 serving as an output portion for outputting the power) is connected to an output side (i.e., a transmission side). Each of the side plate 10 and the inner plate 20 is formed in a circular disc form expanding in a state to intersect with (i.e., in orthogonal to) the rotation axis Ax. In addition, each of the side plate 10 and the inner plate 20 includes portions away from each other in the axial direction. The elastic members 30 positioned between the side plate 10 and the inner plate 20 to extend in the circumferential direction are elastically expanded and contracted in the circumferential direction along with a relative rotation between the side plate 10 and the inner plate 20, which results in absorption of torque fluctuation. Further, the slide member 40 slides between the side plate 10 and the inner plate 20 to generate friction resistance.

The side plate 10 includes wall portions 11 and 12 serving as plate portions. Each of the wall portions 11 and 12 is formed in a circular disc form expanding in a state to intersect with (i.e., in orthogonal to) the rotation axis Ax. The wall portions 11 and 12 include respective portions away from each other in the axial direction. In the embodiment, for example, the wall portion 11 is positioned at a first side in the axial direction (corresponding to a left side in FIG. 2) relative to the wall portion 12 while the wall portion 12 is positioned at a second side in the axial direction (corresponding to a right side in FIG. 2) relative to the wall portion 11. The wall portion 11 includes plural opening portions 11a being spaced away from one another in the circumferential direction while the wall portion 12 includes plural opening portions 12a being spaced away from one another in the circumferential direction. Each of the opening portions 11a and each of the opening portions 12a at least partially overlap each other in the axial direction. The wall portions 11 and 12 are joined together by connection members 13 such as screws and rivets, for example, so as to integrally rotate about the rotation axis Ax. By means of the connection members 13, the wall portions 11 and 12 are joined and connected in a state where a radially outer range of the wall portion 11 and a radially outer range of the wall portion 12 overlap each other. In addition, at least a radially inner range of the wall portion 11 and a radially inner range of the wall portion 12 are positioned away from each other. The side plate 10, specifically, the wall portions 11 and 12, are made of metallic material, for example. The wall portion 11 serves as an example of one of a first wall portion and a second wall portion while the wall portion 12 serves as an example of the other of the first wall portion and the second wall portion.

The inner plate 20 includes a cylindrical portion 21 (hub) at a substantially center and a wall portion 22 (plate portion) extending radially from the substantially center of the cylindrical portion 21. The cylindrical portion 21 is formed in a cylindrical form with reference to the rotation axis Ax. The wall portion 22 extends or protrudes radially outwardly from the cylindrical portion 21 to be formed in a circular annular and plate form expanding in a state to intersect with (i.e., in orthogonal to) the rotation axis Ax. The wall portion 22 includes plural opening portions 22a (for example, penetration bores) being spaced way from one another in the circumferential direction. The inner plate 20 is made of metallic material, for example.

The elastic members 30 extend substantially along the circumferential direction. The elastic members 30 are disposed and sandwiched between the side plate 10 and the inner plate 20 to elastically expand and contract along the substantially circumferential direction in association with the relative rotation between the side plate 10 and the inner plate 20 about the rotation axis Ax. Specifically, the elastic members 30 which are made of metallic material, for example, are coil springs extending substantially along the circumferential direction. As illustrated in FIGS. 1 and 2, each of the elastic members 30 is accommodated within the opening portions 11a, 12a, and 22a overlapping one another in the axial direction. In a case where the side plate 10 and the inner plate 20 rotate relative to each other so that edge portions of the opening portions 11a and 12a of the side plate 10 at one side in the circumferential direction approach an edge portion of the opening portion 22a of the inner plate 20 at the other side in the circumferential direction, the elastic member 30 is elastically contracted by means of the aforementioned edge portions. On the other hand, in a case where the side plate 10 and the inner plate 20 rotate relative to each other so that the edge portions of the opening portions 11a and 12a of the side plate 10 at one side in the circumferential direction are away from the edge portion of the opening portion 22a of the inner plate 20 at the other side in the circumferential direction in a state where the elastic member 30 is elastically contracted within the opening portions 11a, 12a, and 22a, the elastic member 30 is elastically expanded. The elastic members 30 store torque as a compression force by being elastically contracted and discharge the compression force as torque by being elastically expanded. Accordingly, the elastic members 30 are positioned between the side plate 10 and the inner plate 20 in a state to be sandwiched therebetween along the substantially circumferential direction so as to be elastically expanded and contracted along the circumferential direction.

The slide member 40 includes a first slide member 41 and a second slide member 42 being away from each other in the axial direction. The first slide member 41 is connected to or fixed to the wall portion 11 of the side plate 10 while the second slide member 42 is connected to or fixed to the wall portion 12 of the side plate 10. The slide member 40 reduces oscillation or noise by friction torque (slide torque) generated in a case where the side plate 10 and the inner plate 20 rotate relative to each other about the rotation axis Ax. The slide member 40 is made of resin material or synthetic resin material, for example.

Figure 3:
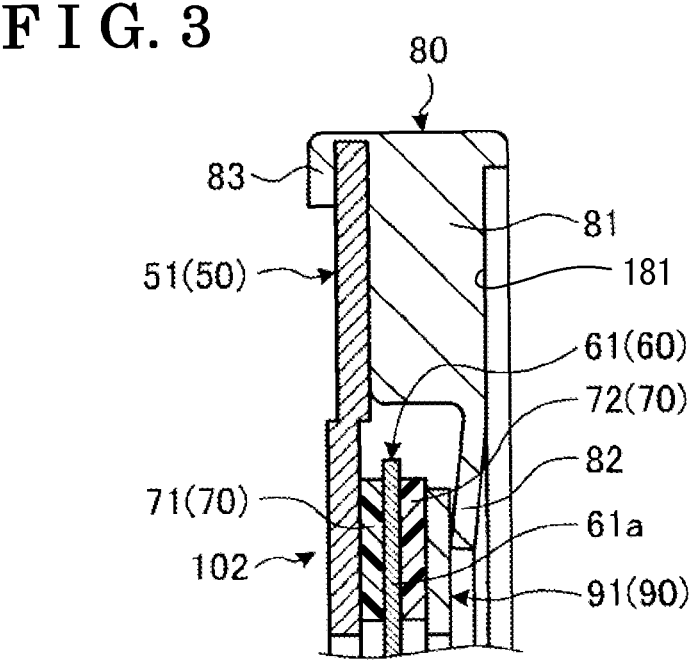
FIG. 3 is a partially enlarged view of a limiter portion illustrated in FIG. 2.

As illustrated in FIGS. 2 and 3, the limiter portion 102 (limiter device) is positioned at the radially outer side of the damper portion 101. Accordingly, the damper apparatus 100 in which the damper portion 101 and the limiter portion 102 are arranged to face each other in the radial direction may be downsized as compared to a case where the damper portion 101 and the limiter portion 102 are arranged to face each other in the axial direction.

The limiter portion 102 is formed in an annular form as a whole. As illustrated in FIG. 2, the limiter portion 102 includes a first member 50, a friction member 70 (a first friction member 71), a second member 60, the friction member 70 (a second friction member 72) and a fourth member 90 in the mentioned order from the first side (left side in FIG. 2) to the second side (right side in FIG. 2) in the axial direction. The first member 50, the friction member 70 (the first and second friction members 71 and 72), the second member 60 and the fourth member 90, each of which is formed in an annular and plate form expanding in a state to intersect with (i.e., in orthogonal to) the rotation axis Ax, are laminated in tightly contact with one another in the axial direction from the first side (left side in FIG. 2) to the second side (right side in FIG. 2). A third member 80 (flywheel) is positioned at the radially outer side of the second member 60, the friction member 70 (the first and second friction members 71 and 72) and the fourth member 90. In addition, the first member 50 and a plate spring portion 82 of the third member 80 sandwich therebetween the first friction member 71, the second member 60, the second friction member 72, and the fourth member 90 in the axial direction to elastically press the first friction member 71, the second member 60, the second friction member 72 and the fourth member 90 by wrapping around from the radially outer side thereof. The limiter portion 102 causes the side plate 10 and the inner plate 20 to slip and rotate relative to each other in a case where torque which exceeds a predetermined value is input from one of the side plate 10 and the inner plate 20 to thereby restrict the torque which exceeds the predetermined value from being transmitted to the other of the side plate 10 and the inner plate 20.

The first member 50 serving as a first plate and a thrust plate includes a wall portion 51 and engagement portions 52. The wall portion 51 (plate portion) is formed in an annular and plate form expanding in a state to intersect with (i.e., in orthogonal to) the rotation axis Ax. Plural opening portions 51a, for example, holes as illustrated in FIG. 1, are formed at the wall portion 51 to be spaced away from one another in the circumferential direction. The engagement portions 52 (projecting portions) are formed at the radially inner side (i.e., the side where the rotation axis Ax is provided) of the respective opening portions 51a of the wall portion 51. Each of the engagement portions 52 protrudes from the wall portion 51 to the second side (right side in FIG. 2) in the axial direction so as to be orthogonal to the wall portion 51. In the embodiment, the plural engagement portions 52 are formed at intervals in the circumferential direction. The first member 50 is made of metallic material, for example.

The second member 60 serving as a second plate and a middle plate is positioned at the second side (right side in FIG. 2) of the first member 50 in the axial direction. The second member 60 includes a wall portion 61 (plate portion) formed in an annular and plate form expanding in a state to intersect with (i.e., in orthogonal to) the rotation axis Ax. The wall portion 61 includes a first section 61a and a second section 61b. The first section 61a is a radially outer portion of the wall portion 61. The second section 61b is a radially inner portion of the wall portion 61. The first section 61a axially overlaps the wall portion 51 of the first member 50 to be positioned away therefrom at the second side in the axial direction. The second section 61b is sandwiched between the wall portion 11 and the wall portion 12 of the side plate 10. The second section 61b is connected or fixed to the wall portions 11 and 12 of the damper portion 101 by the connection members 13 (for example, screws or rivets). The second member 60 integrally rotates with the side plate 10 at the rotation axis Ax. The second member 60 is made of metallic material, for example.

The fourth member 90 serving as a fourth plate and a pressure plate includes a wall portion 91, first engagement portions 92, and second engagement portions 93. The wall portion 91 (plate portion) is formed in an annular and plate form expanding in a state to intersect with (i.e., in orthogonal to) the rotation axis Ax. The wall portion 91 includes a portion overlapping the wall portion 51 of the first member 50 and the first section 61a of the second member 60. The first engagement portions 92 (projecting portions) are positioned at end portions of the wall portion 91 at the radially outer side to extend in a direction to intersect with (i.e., direction orthogonal to) the wall portion 91 towards the first side in the axial direction (left side in FIG. 2 towards the first member 50). In the embodiment, the plural first engagement portions 92 (see FIG. 1) are provided so as to correspond to the opening portions 51a of the first member 50 in a state to be spaced away from one another in the circumferential direction. The first engagement portions 92 are inserted to or press-fitted to the respective opening portions 51a. Accordingly, the fourth member 90 is combined or united to the first member 50. Specifically, the fourth member 90 integrally rotates with the first member 50 about the rotation axis Ax in a state where the first engagement portions 92 engage with peripheral edge portions of the respective opening portions 51a of the first member 50. The second engagement portions 93 (projecting portions) are provided at the radially inner side of the first engagement portions 92 of the wall portion 91. The second engagement portions 93 protrude from the wall portion 91 towards the first side in the axial direction (left side in FIG. 2) in the direction to intersect with (i.e., direction orthogonal to) the wall portion 91. In the embodiment, the plural second engagement portions 93 are formed to be spaced away from one another in the circumferential direction. The fourth member 90 is made of metallic material, for example. The fourth member 90 may serve as a portion of the first member 50.

The friction member 70 includes the first friction member 71 and the second friction member 72. Each of the first friction member 71 and the second friction member 72 is formed in an annular and plate form expanding in a state to intersect with (i.e., in orthogonal to) the rotation axis Ax. As illustrated in FIG. 3, the first friction member 71 is sandwiched between the wall portion 51 of the first member 50 and the first section 61a of the second member 60. The second friction member 72 is sandwiched between the first section 61a of the second member 60 and the wall portion 91 of the fourth member 90. In addition, plural opening portions 71a (for example, penetration bores) are formed at the first friction member 71 to be spaced away from one another in the circumferential direction while plural opening portions 72a (for example, penetration bores) are formed at the second friction member 72 to be spaced away from one another in the circumferential direction. The engagement portions 52 of the first member 50 are inserted and press-fitted to the respective opening portions 71a while the second engagement portions 93 of the fourth member 90 are inserted and press-fitted to the respective opening portions 72a. That is, in the embodiment, the first member 50, the first friction member 71, the second friction member 72, and the fourth member 90 are combined or united one another. The first friction member 71 integrally rotates with the first member 50 about the rotation axis Ax by means of the engagement portions 52 while the second friction member 72 integrally rotates with the fourth member 90 about the rotation axis Ax by means of the second engagement portions 93. The friction member 70 is made of synthetic resin material including grass fiber material and synthetic rubber, for example.

The third member 80 includes a spindle portion (spindle member, weight portion, or anchor portion) 81 serving as a first portion, the plate spring portion (spring portion) 82 serving as a second portion and plural protrusion portions 83 serving as third portions.

The spindle portion 81 (base portion) is formed in an annular (circular) form with reference to the rotation axis Ax. The spindle portion 81 is provided at a radially end portion of the damper apparatus 100. Specifically, the spindle portion 81 is positioned at the radially outer side (i.e., direction away from the rotation axis Ax) of the damper portion 101. In addition, at least a portion of the spindle portion 81 is positioned further away from the rotation axis Ax than the first member 50, the second member 60, the fourth member 90, the first friction member 71 and the second friction member 72, for example. The spindle portion 81 is attached to the first member 50 to integrally rotate therewith. The spindle portion 81 may function as an inertia body such as a balance wheel and a flywheel, for example. The spindle portion 81 includes a recess portion 181 so that a plate provided at a transmission (i.e., a member that is mounted at the output portion) is configured to be inserted and positioned within the recess portion 181. Because of the recess portion 181, the transmission may be easily positioned when assembled. The spindle portion 81 supports the plate spring portion 82 and includes a function for positioning the transmission when the damper apparatus 100 and the transmission are assembled on each other.

The plate spring portion 82 protrudes towards the rotation axis Ax from the spindle portion 81 to be positioned at an opposite side from a side where the first member 50 is provided relative to the fourth member 90. The plate spring portion 82 is formed in an annular and plate form expanding in a state to intersect with (i.e., in orthogonal to) the rotation axis Ax. The plate spring portion 82 presses the fourth member 90, the second friction member 72, the second member 60 and the first friction member 71 against the first member 50. Specifically, the plate spring portion 82 presses the second member 60 against the first member 50 in a state where the first friction member 71 is sandwiched therebetween. In addition, the plate spring portion 82 presses the fourth member 90 against the second member 60 in a state where the second friction member 72 is sandwiched therebetween. That is, a friction force is generated between the first friction member 71 and the second member 60 while a friction force is generated between the second friction member 72 and the second member 60 by a load resulting from a biasing force of the plate spring portion 82. Specifically, in the embodiment, each of the first member 50 and the fourth member 90 is inhibited from slipping relative to the second member 60 in the circumferential direction until a torque difference exceeding a maximum static friction force is generated between the first friction member 71 and the second member 60 or between the second friction member 72 and the second member 60. In a case where the torque difference that exceeds the maximum static friction force is obtained between the first friction member 71 and the second member 60 or between the second friction member 72 and the second member 60, each of the first member 50 and the fourth member 90 slips relative to the second member 60 in the circumferential direction.

Each of the protrusion portions 83 (rivet portions) protrudes from the spindle portion 81 to the first side in the axial direction (to the left side in FIG. 2) to be bent into a hook. The protrusion portion 83 is positioned at an opposite side from a side where the second member 60 is provided relative to the first member 50. The plural protrusion portions 83 (for example, twelve protrusion portions 83 in the embodiment as illustrated in FIG. 1) are formed at the spindle portion 81 to be spaced away from one another by predetermined intervals in the circumferential direction. The first member 50 and the third member 80 are joined or combined (i.e., via a riveting fixation) by the protrusion portions 83 accordingly. In the embodiment, the spindle portion 81, the plate spring portion 82 and the protrusion portions 83 are integrally formed. Thus, as compared to configurations where the spindle member (inertia body) and the spring member are separately and individually provided and where the spindle member (inertia body) and the first member are combined or united by a connection member such as a rivet, for example, the configuration of the present embodiment may be simplified.

Figure 4:
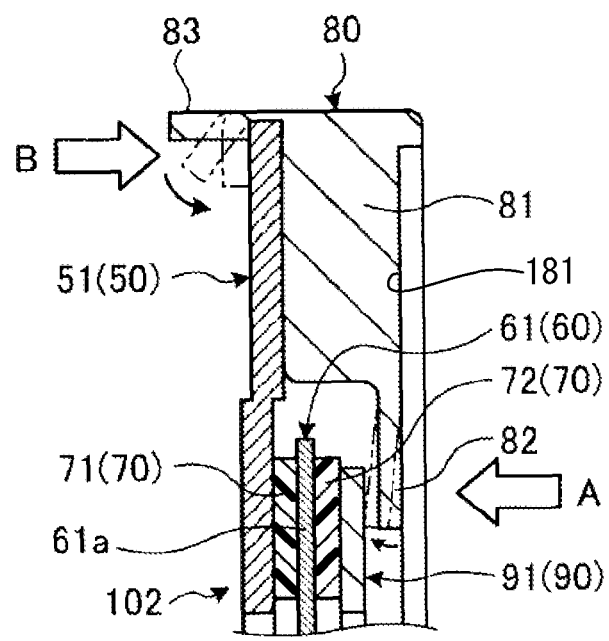
FIG. 4 is a partially enlarged view of the limiter portion in a state before a protrusion portion and a plate spring portion are secured by riveting.

The plate spring portion 82 and the protrusion portions 83 may be simultaneously press-formed from opposed sides in the axial direction by a pressing machine, for example. Specifically, as illustrated in FIG. 4, first, a subassembly including a portion of the limiter portion 102 fixed to the damper portion 101, and the first member 50 are arranged in the mentioned order from the right side to the left side in FIG. 4 in the axial direction between the plate spring portion 82 and the protrusion portions 83 which are in a state before being bent (before being press-formed). The subassembly includes the fourth member 90, the second friction member 72, the second member 60 and the first friction member 71 in the sandwiched or laminated state. Next, the protrusion portions 83 are slightly bent towards the second side in the axial direction (to the right side corresponding to a direction B in FIG. 4) so that the first member 50 is tentatively secured. Finally, the plate spring portion 82 and the protrusion portions 83 are pressed at a time so that the plate spring portion 82 is pressed to the first side in the axial direction (to the left side corresponding to a direction A in FIG. 4) while the protrusion portions 83 are pressed to the second side in the axial direction. According to the aforementioned simple manufacturing procedures, the plate spring portion 82 is molded or formed and at the same time the protrusion portions 83 may be secured to the first member 50 by riveting. The third member 80 may be made of metallic material such as carbon steel, for example. One of the plate spring portion 82 and the protrusion portion 83 may be press-formed before the other of the plate spring portion 82 and the protrusion portion 83 is press-formed.

According to the aforementioned configuration, in a case where a torque difference between the damper portion 101 and a portion of the limiter portion 102 at a side where the first member 50 is provided (i.e., between the side plate 10 at the input side and the inner plate 20 at the output side) is provided is smaller than a predetermined value (a set value or a limit torque), the slippage is inhibited from occurring at the limiter portion 102 because of the biasing force of the plate spring portion 82. The damper apparatus 100 including the damper portion 101 and the limiter portion 102 rotates in a unified manner accordingly. On the other hand, in a case where the torque difference between the damper portion 101 and the portion of the limiter portion 102 at the side where the first member 50 is provided is equal to or greater than the predetermined value (the set value), the slippage caused by exceeding the friction force (the maximum static friction force) which results from the biasing force of the plate spring portion 82 is generated at the limiter portion 102, i.e., between the damper portion 101 and the portion of the limiter portion 102 at the side where the first member 50 is provided. Accordingly, the excessive torque transmission exceeding the predetermined value is restrained. The predetermined value (limit torque) may be specified on a basis of specifications including a surface property, wideness, and hardness of each of the members that friction each other (the friction member 70 and the second member 60), specifications (deformation volume) related to modulus of elasticity such as thickness and length of the plate spring portion 82, for example, or a pressing load and stroke in a press working, for example.

Accordingly, as an example in the embodiment, the third member 80 serving as the inertia body includes the spindle portion 81 and the plate spring portion 82 which is integrally formed with the spindle portion 81 to press the first member 50 and the second member 60 against each other in a state where the friction member 70 is sandwiched therebetween. Thus, the configuration of the damper apparatus 100 may be simplified. As compared to a known configuration where a spring member or a member for supporting the spring member is necessary in addition to the spindle member (the inertia body), the number of components, cost, size, and weight of the damper apparatus may be reduced.

In addition, as an example in the embodiment, at least a portion of the spindle portion 81 is positioned further apart from the rotation axis Ax than the first member 50, the second member 60 and the friction member 70. Thus, because the spindle portion 81 may be positioned further away from the rotation axis Ax, inertia moment of the spindle portion 81 is likely to increase. Thus, inertia force of the damper apparatus 100 is likely to increase. The damper apparatus 100 is also likely to be downsized in the axial direction (i.e., formed to be thinner).

Further, as an example in the embodiment, the third member 80 includes the protrusion portions 83 protruding from the spindle portion 81 in the opposite direction from the direction where the second member 60 is disposed relative to the first member 50. Then, the first member 50, the second member 60, and the friction member 70 are sandwiched between the protrusion portions 83 and the plate spring portion 82. Thus, the first member 50, the second member 60, and the friction member 70 may be combined or united by a relatively simple configuration including the third member 80. In addition, as compared to a case where the spindle member (inertia body) and the first member are fixed to each other by a connection member such as a rivet, for example, the number of components may be reduced. Time and expense for manufacturing the damper apparatus 100 may be further reduced.

Furthermore, as an example in the embodiment, the protrusion portions 83 and the plate spring portion 82 are simultaneously pressed to be formed. Thus, the limiter portion 102 may be further easily or promptly formed.

Furthermore, as an example in the embodiment, the plural protrusion portions 83 are provided at intervals in the circumferential direction. Thus, the third member 80 is firmly combined or united to the first member 50 by the plural protrusion portions 83. As compared to a configuration where one protrusion portion is annularly formed, an increase of material cost of the third member 80 is restrained.

In the embodiment, the plural (twelve) protrusion portions 83 each in a tongue form (hook form) are formed at even intervals in the circumferential direction. Alternatively, the different number of protrusion portions 83 (for example, six protrusion portions 83) may be formed along the circumferential direction. Further alternatively, the protrusion portions 83 may be formed at uneven intervals in the circumferential direction. Further alternatively, one or more of the protrusion portion(s) 83 in an annular form or an arc form may be formed.

In the embodiment, the plate spring portion 82 is provided annularly. Alternatively, plural plate springs each of which is in an arm form, a tongue form, a rectangular plate form, an arc plate form, and a flange form may be provided.

The aforementioned configuration of the embodiment is an example and the embodiment may be appropriately changed or modified such as by including omissions and replacements, for example. In addition, specifications of components and members of the embodiment may be appropriately changed.

According to the aforementioned embodiment, because the third member 80 includes the spindle portion 81 and the plate spring portion 82 that is integrally formed with the spindle portion 81, the spindle portion 81 may function in a state where the friction member 70 is pressed against the first member 50 and the second member 60 by the plate spring portion 82 of the third member 80. The configuration of the damper apparatus 100 may be more simplified than a configuration of a known damper apparatus. In this case, the configuration may be easily simplified in a case where the spindle portion 81 and the plate spring portion 82 are integrally formed.

In the embodiment, at least a portion of the spindle portion 81 is positioned further away than the first member 50, the second member 60 and the friction member 70 relative to the rotation center Ax.

Accordingly, the spindle portion 81 is separated from the rotation axis Ax, which may increase the inertia moment of the spindle portion 81.

In the embodiment, the third member 80 includes the protrusion portion 83 positioned at an opposite side from a side where the second member 60 is provided relative to the first member 50 in the axial direction of the rotation center Ax. The first member 50, the second member 60 and the friction member 70 are sandwiched between the protrusion portion 83 and the plate spring portion 82.

Accordingly, the first member 50, the second member 60, and the friction member 70 may be combined or united by a relatively simple configuration including the third member 80.

In the embodiment, the protrusion portion 83 and the plate spring portion 82 are pressed from opposed sides in the axial direction of the rotation center Ax to sandwich the second member 60 and the friction member 70 between the protrusion portion 83 and the plate spring portion 82.

Accordingly, the limiter portion 102 may be further easily or promptly formed by a press-working.

In the embodiment, the protrusion portion includes the plural protrusion portions 83 provided at intervals in the circumferential direction of the rotation center Ax.

Accordingly, the third member 80 may be further firmly combined or united to the first member 50 by the plural protrusion portions 83.

In the embodiment, the spindle portion 81 supports the plate spring portion 82 and includes the recess portion 181 for positioning the member (the plate provided at the transmission) that is mounted at the output portion (the inner plate 20).

Accordingly, because of the recess portion 181, the member that is mounted at the output portion may be easily positioned when assembled on the damper apparatus 100.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A damper apparatus comprising:
a damper portion including an elastic member which is provided between an input portion for inputting a power from a power unit and an output portion for outputting the power to absorb a torque fluctuation by expansion and contraction of the elastic member in a circumferential direction of the damper portion; and
a limiter portion configured to restrict transmission of a torque to a torque path between the input portion and the output portion of the damper portion which exceeds a predetermined value,
the limiter portion including a first member and a second member being rotatable at a rotation center, a friction member sandwiched between the first member and the second member, and a third member connected to the first member, the third member including a spindle portion configured to function as an inertia body and a plate spring portion integrally formed with the spindle portion and bent toward the friction member relative to the spindle portion to press the first member and the second member in a state where the friction member is sandwiched between the first member and the second member.

2. The damper apparatus according to claim 1, wherein at least a portion of the spindle portion is positioned further away than the first member, the second member and the friction member relative to the rotation center.

3. The damper apparatus according to claim 1, wherein the third member includes a protrusion portion positioned at an opposite side from a side where the second member is provided relative to the first member in an axial direction of the rotation center, and
the first member, the second member and the friction member are sandwiched between the protrusion portion and the plate spring portion.

4. The damper apparatus according to claim 3, wherein the protrusion portion and the plate spring portion are pressed from opposed sides in the axial direction of the rotation center to sandwich the second member and the friction member between the protrusion portion and the plate spring portion.

5. The damper apparatus according to claim 3, wherein the protrusion portion includes a plurality of protrusion portions provided at intervals in the circumferential direction of the rotation center.

6. The damper apparatus according to claim 1, wherein the spindle portion supports the plate spring portion and includes a recess portion for positioning a member that is mounted at the output portion.

7. The damper apparatus according to claim 1, wherein the third member has a press-formed portion for connecting to the first member at an end of the first member in a radial direction.

8. The damper apparatus according to claim 1, wherein the third member comprises a radially outer-most portion of the damper apparatus.

* * * * *